United States Patent [19]
Druin

[11] 3,723,157
[45] Mar. 27, 1973

[54] PRODUCTION OF RESIN IMPREGNATED FIBROUS GRAPHITE RIBBONS

[75] Inventor: Melvin Druin, West Orange, N.J.

[73] Assignee: Celanese Corporation, New York, N.Y.

[22] Filed: Nov. 7, 1969

[21] Appl. No.: 874,731

[52] U.S. Cl. ............117/46 CB, 23/209.1, 260/37, 264/29, 117/161 ZB
[51] Int. Cl. .............................................C01b 31/04
[58] Field of Search.....117/46 CC, 46 CB; 23/209.1; 260/37; 264/29

[56] References Cited

UNITED STATES PATENTS

| | | | |
|---|---|---|---|
| 3,539,295 | 11/1970 | Ram | 23/209.4 |
| 3,552,923 | 1/1971 | Carpenter et al. | 23/209.4 |
| 3,567,380 | 3/1971 | Townsend | 23/209.4 |
| 3,471,322 | 10/1969 | Medney | 117/115 |
| 3,323,941 | 6/1967 | Van Dijk | 117/115 |
| 3,214,324 | 10/1965 | Peerman | 117/161 |
| 3,367,812 | 2/1968 | Watts | 117/46 CC |
| 3,235,323 | 2/1966 | Peters | 23/209.1 F |
| 3,412,062 | 11/1968 | Johnson et al. | 23/209.1 |
| 3,108,018 | 10/1963 | Lewis | 117/46 CC |

Primary Examiner—William D. Martin
Assistant Examiner—Michael S. Sofocleous
Attorney—Thomas J. Morgan, Charles B. Barris and Kenneth E. Macklin

[57] ABSTRACT

A process is provided wherein resin impregnated graphite ribbons may be efficiently produced which may be used in the manufacture of fiber reinforced composite structures. A plurality of multifilament bundles of a fibrous material capable of undergoing graphitization are continuously passed through a graphitization zone from which they are continuously conveyed to and through a coating zone in which they are impregnated with a thermosetting resin. Throughout the continuous process of the invention, the multifilament bundles are provided in an essentially parallel relationship in the form of a ribbon and are continuously passed in the direction of their length. The ribbon product of the invention is particularly suited for use in the formation of strong lightweight composites by filament winding, or other composite forming techniques.

24 Claims, 3 Drawing Figures

PATENTED MAR 27 1973　　3,723,157

INVENTOR,
MELVIN L. DRUIN

PRODUCTION OF RESIN IMPREGNATED FIBROUS GRAPHITE RIBBONS

BACKGROUND OF THE INVENTION

In recent years considerable attention has been directed to the production of various fiber reinforced composites. The interest in such composites has been intensified by the demands presented by the aerospace industry for strong lightweight structural materials which preferably retain their structural integrity over wide temperature ranges.

As is generally known, a common technique employed in the production of composites involves the filament winding or molding of articles of the desired configuration utilizing continuous lengths of fibrous materials having a coating of a resinous material which ultimately serves as the matrix in the resulting article. These materials when present in relatively long lengths are commonly designated as "preimpregnated" yarns or tapes or "prepreg" yarns or tapes. It is, of course, desirable that the preimpregnated fibrous materials exhibit an adequate shelf life to permit transportation and at least limited storage prior to use, while being capable of ultimately producing an essentially solid composite structure. Heretofore, the continuous lengths of fibrous graphite which serve as the reinforcing medium have been commonly produced on a batch basis, for instance while a single end is wound on a suitable frame or support. Subsequently, the resulting lengths of fibrous graphite have commonly been resin impregnated on a batch basis. There has remained a need for a process for the efficient formation of high quality resin impregnated graphite tapes or ribbons of substantial length which may be wound to form composites exhibiting uniform physical properties.

It is an object of the invention to provide an improved process for the production of a resin impregnated graphite ribbon.

It is an object of the invention to provide a continuous process wherein resin impregnated graphite ribbons are expeditiously formed.

It is another object of the invention to provide a process wherein resin impregnated graphite ribbons of various widths may be conveniently formed.

It is a further object of the invention to provide a process wherein resin impregnated graphite ribbons are formed which comprise multifilament graphite bundles having little or no twist aligned in an essentially parallel relationship.

These and other objects, as well as the scope, nature, and utilization of the invention will be apparent from the following detailed description and appended claims.

SUMMARY OF THE INVENTION

It has been found that a process for the continuous production of a resin impregnated graphite ribbon for use in the manufacture of fiber reinforced composites comprises:

a. continuously passing a plurality of multifilament bundles of a fibrous material capable of undergoing graphitization while in an essentially parallel relationship and in the form of a ribbon through a graphitization zone at a temperature of about 2,000° to 3,100° C. (preferably 2,400° to 3,100° C.) and containing an inert atmosphere for a residence time sufficient to convert the bundles to graphitic carbon while retaining their original fibrous configuration essentially intact, b. continuously feeding the resulting bundles of fibrous graphitic carbon from the graphitization zone to a coating zone, c. continuously passing the bundles of graphitic carbon through a coating zone while retaining the essentially parallel relationship of the bundles and the ribbon configuration wherein the ribbon is impregnated with a thermosetting resin, and d. withdrawing the resulting resin impregnated graphite ribbon. In a preferred embodiment of the process the multifilament bundles are a stabilized acrylic fibrous material which is initially carbonized on a continuous basis immediately prior to graphitization.

DETAILED DESCRIPtION OF THE INVENTION

Figure 3:
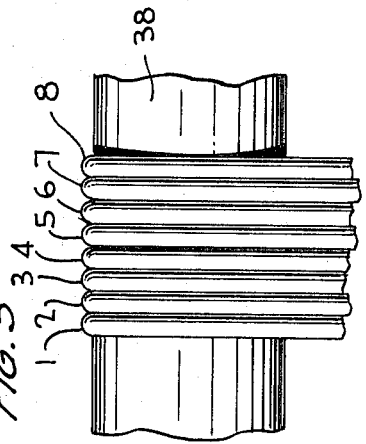
FIG. 3 illustrates the configuration assumed by the plurality of multifilament bundles as they are positioned upon a roll immediately prior to passage through the graphitization zone in an essentially parallel relationship and in the form of a ribbon.

The multifilament bundles of fibrous material utilized in the process of the present invention are capable of undergoing graphitization while retaining their original fibrous configuration essentially intact. The fibrous bundles treated in the process may be formed by conventional techniques and may be provided in a variety of physical configurations. For instance, the bundles may assume the configuration of continuous lengths of multifilament yarns, tows, strands, cables, or similar fibrous assemblages. In a preferred embodiment of the invention the multifilament bundles are lengths of a continuous multifilament yarn.

The multifilament bundles of fibrous material which are treated in the present process may optionally be provided with a twist which tends to improve the handling characteristics. For instance, a twist of about 0.1 to 5 tpi, and preferably about 0.3 to 1.0 tpi may be utilized. Also, a false twist may be used instead of or in addition to a real twist. Alternatively, one may select bundles of fibrous material which possess essentially no twist. These may be satisfactorily treated in accordance with the present invention and are particularly suited for the production of resin impregnated ribbons for use in composite applications where articles of optimum strength are required.

The multifilament fibrous bundles which are graphitized in accordance with the present process may be carbonaceous (i.e., contain at least about 90 percent carbon by weight) and exhibit an essentially amorphous X-ray diffraction pattern. As is known in the art, amorphous carbonaceous fibrous materials suitable for graphitization may be formed by a variety of techniques. For instance, organic polymeric fibrous materials which are capable of undergoing thermal stabilization may be initially stabilized by treatment in an appropriate atmosphere at a moderate temperature (e.g., 200°–400° C.), and subsequently heated in an inert atmosphere at a more highly elevated temperature, e.g., 900° to 1,000° C. or more until a carbonized fibrous material is formed which exhibits an essentially amorphous X-ray diffraction pattern. The exact temperature and atmosphere utilized during the initial stabilization of an organic polymeric fibrous material commonly vary with the composition of the precursor as will be apparent to those skilled in the art. During the carbonization reaction elements present in the fibrous material other than carbon (e.g., oxygen and hydrogen) are expelled. Suitable organic polymeric fibrous materials from which the fibrous bundles capable of undergoing graphitization may be derived include an acrylic polymer, a cellulosic polymer, a polyamide, a polybenzimidazole, polyvinyl alcohol, etc. As discussed hereafter, acrylic polymeric materials are particularly suited for use in the formation of the fibrous bundles employed in the present process. Illustrative examples of suitable cellulosic materials include the natural and regenerated forms of cellulose, e.g., rayon. Illustrative examples of suitable polyamide materials include the aromatic polyamides, such as nylon 6T, which is formed by the condensation of hexamethylenediamine and terephthalic acid. An illustrative example of a suitable polybenzimidazole is poly-2,2'-m-phenylene-5,5'-bibenzimidazole.

A fibrous acrylic polymeric material prior to stabilization may be formed primarily of recurring acrylonitrile units. For instance, the acrylic polymer should contain not less than about 85 mol percent of recurring acrylonitrile units with not more than about 15 mol per cent of a monovinyl compound which is copolymerizable with acrylonitrile such as styrene, methyl acrylate, methyl methacrylate, vinyl acetate, vinyl chloride, vinylidene chloride, vinyl pyridine, and the like, or a plurality of such monomers.

During the formation of a carbonaceous starting material for use in the present process multifilament bundles of an acrylic fibrous material may be initially stabilized in air (i.e., preoxidized) on a continuous basis in accordance with the teachings of U.S. Pat. application, Ser. No. 749,957, filed Aug. 5, 1968, of Dagobert E. Stuetz, which is assigned to the same assignee as the instant invention and is herein incorporated by reference. More specifically, the acrylic fibrous material should be either an acrylonitrile homopolymer or an acrylonitrile copolymer which contains no more than about 5 mol percent of one or more monovinyl comonomers copolymerized with acrylonitrile. In a particularly preferred embodiment of the invention the multifilament bundles are derived from an acrylonitrile homopolymer. The stabilized acrylic fibrous material preoxidized in air is black in appearance, retains its original fibrous configuration essentially intact, and is non-burning when subjected to an ordinary match flame. An additional stabilization procedure is disclosed in commonly assigned U.S. Pat. application, Ser. No. 865,332, filed Oct. 10, 1969, of Kenneth S. Burns and William M. Cooper which is herein incorporated by reference.

In the present process the multifilament fibrous bundles of a fibrous material capable of undergoing graphitization are continuously passed through a graphitization zone at a temperature of about 2,000° to 3,100° C. (preferably 2,400° to 3,100° C.) which contains an inert atmosphere for a residence time sufficient to substantially convert the bundles to graphitic carbon while retaining their original fibrous configuration essentially intact. Suitable inert atmospheres in which the graphitization reaction may be conducted include nitrogen, argon, helium, etc. For instance, amorphous carbonaceous multifilament bundles of a fibrous material may be passed through the graphitization zone for a residence time of about 5 seconds to 4 minutes to produce graphitization. Longer graphitization heating times may be selected but generally yield no commensurate advantage. Preferred residence times in the graphitization zone range from about 20 seconds to 120 seconds.

Regardless of their derivation, a plurality of the multifilament bundles of fibrous material capable of undergoing graphitization are continuously passed through the graphitization zone while in an essentially parallel relationship and in the form of a ribbon. The individual multifilament bundles are parallel or collimated throughout the length of the ribbon, and the ribbon has a flat configuration. The thickness of the ribbon is essentially that of a single multifilament bundle. The number of multifilament bundles which are arranged in parallel may be varied depending upon the width of the resin impregnated ribbon desired and the capacity of the graphitization zone. For instance, about 4 to 100 or more bundles may be arranged in parallel.

When the multifilament bundles are a stabilized acrylic fibrous material, these bundles may be carbonized as well as graphitized while in the form of a ribbon in a continuous operation in accordance with the heating schedule of U.S. Pat. application, Ser. No. 777,275, filed Nov. 20, 1968, of Charles M. Clarke which is assigned to the same assignee as the instant invention and is herein incorporated by reference, and subsequently resin impregnated.

In accordance with this preferred embodiment of the present invention the plurality of bundles of stabilized acrylic fibrous material derived from a fibrous material selected from the group consisting of an acrylonitrile homopolymer and acrylonitrile copolymers which contain at least about 85 mol percent of acrylonitrile units and up to about 15 mol percent of one or more monovinyl units copolymerized therewith are rapidly carbonized on a continuous basis by passage through a heating zone provided with an inert atmosphere in which their temperature is increased from within the range of about 20° to 500° C. to a temperature within the range of about 900° to 1,600° C. (preferably to a temperature within the range of about 1,400° to 1,600° C.), within a period of about 3 seconds to about 10 minutes, and preferably within a period of 3 seconds to about 5 minutes. Suitable inert atmospheres in which the carbonization reaction may be conducted include nitrogen, argon, helium, etc.

It accordingly follows in a preferred embodiment of the invention that suitable mean heating rates for elevating the ribbon of stabilized acrylic fibrous material to a temperature of about 1,400° to 1,600° C. in order to produce carbonization range from about 2° to 300° C. per second. In a particularly preferred embodiment of the invention the multifilament bundles are heated to a temperature of about 1,400° to 1,600° C. in about 20 to 60 seconds. Particularly preferred mean heating rates for heating to a temperature of about 1,400° C. to about 1,600° C. accordingly range from about 23° to 45° C. per second. The heating rates employed need not be constant, but may be varied within the period of temperature elevation. Particularly satisfactory rates can be achieved when the rate is progressively increased. The multifilament bundles of stabilized acrylic fibrous material undergoing treatment are heated at a temperature within the range of about 900° to 1,600° C. wherein a carbonized ribbon is formed (e.g., for about 3 seconds to about 5 minutes), and the resulting carbonized ribbon is subsequently continuously passed through a heating zone provided with an inert atmosphere in which it is heated to a temperature in the range of about 2,000° to 3,100° C. (preferably 2,400° to 3,100° C.) for a residence time sufficient to substantially convert the fibrous bundles to graphitic carbon. The presence of graphitic carbon may be detected by the characteristic X-ray diffraction pattern of graphite. Suitable inert atmospheres for use in the graphitization zone include nitrogen, argon, helium, etc. A graphitized ribbon of superior modulus may generally be formed in about 20 to 120 seconds while passing the carbonized bundles through a graphitization zone at about 2,400° to 3,100° C. Longer residence times may be selected but generally yield no commensurate advantage. The modulus of the graphitized ribbon tends to increase with the maximum temperature achieved during graphitization. The temperature of the ribbon is preferably progressively increased from a temperature within the range of about 900° to 1,600° C. (preferably about 1,400° to 1,600° C.) to the graphitization temperature of about 2,000° to 3,100° C. (preferably about 2,400° to 3,100° C.) within about 2 seconds to about 30 seconds.

The equipment utilized to produce graphitization or carbonization followed by graphitization in the present process may be varied widely. It is essential that the apparatus selected be capable of producing the required temperatures while excluding the presence of an oxidizing atmosphere. For instance, suitable apparatus include induction furnaces, tube furnaces in which a hollow graphite susceptor is heated by direct resistance heating, direct resistance heating apparatus in which electric current is passed directly through the fibrous material, apparatus capable of producing reducing flames, electric arc furnaces, lasers, thermal image equipment such as solar furnaces, apparatus capable of producing low temperature plasma flames, and the like. The multifilament bundles in the form of a ribbon are continuously passed through one or more heating apparatus and subjected to the requisite temperatures to produce a graphite ribbon. Temperature profiles may be provided within a given heating apparatus or the material may be successively passed through a series of apparatus maintained at progressively increasing temperatures.

In a preferred embodiment of the invention, the bundles undergoing graphitization or carbonization and graphitization are heated by use of an induction furnace. In such a procedure the multifilament bundles while in the form of a ribbon are passed through a hollow graphite tube or other susceptor which is situated within the windings of the induction coil. By varying the length of the graphite susceptor, the length of the induction coil, and the rate at which the ribbon is passed through the susceptor, many apparatus arrangements capable of carrying out the graphitization or carbonization and graphitization may be selected. For large scale production, it is of course preferred that relatively long susceptors by used so that the ribbon may be more rapidly passed through the same while being graphitized or carbonized and graphitized.

During the formation of graphitic carbon within the fibrous bundles of the ribbon a tensional force may be optionally applied to the bundles undergoing graphitization in order to modify the physical properties of the same. When a relatively high tensional force is applied in the graphitization zone, it is preferable that the stress exerted upon the ribbon be substantially dissipated prior to its passage through the coating zone.

The resulting graphite ribbon is continuously fed from the graphitization zone in which it is formed to a coating zone. The continuous transport of the graphite ribbon to the coating zone may be facilitated by passing the same over rotating rollers, or through the use of other techniques which will be apparent to those skilled in fiber technology. The coating zone is preferably positioned in relatively close proximity to the graphitization zone so that the coating step may be carried out in an efficient manner without undue delay.

The graphite bundles while in an essentially parallel relationship and in the form of a ribbon are impregnated with a thermosetting resin while being continuously passed through the coating zone. The thermosetting resin may be applied to the continuously moving graphite ribbon by a variety of techniques. For instance, the ribbon may be immersed or dipped in a suitable resin bath having a liquid consistency while being passed through the coating zone. Alternatively, the liquid thermosetting resin may be applied to the graphite ribbon during its passage through the coating zone by padding, spraying, or any other convenient technique. The coating technique selected should be such that the individual filaments making up the multifilament bundles are not appreciably damaged during the coating procedure, or the ribbon configuration of the bundles disturbed.

The thermosetting resin which is applied to the graphite ribbon in the coating zone is of liquid consistency, and may be applied from either a solvent or a solventless system. When a solventless system of a thermosetting resin is selected for use in the process, the graphite ribbon is preferably coated in accordance with the teachings of U.S. Pat. application, Ser. No. 791,033, filed Jan. 14, 1969, of Ramesh R. Desai, which is assigned to the same assignee as the present invention and is herein incorporated by reference. A solventless system comprising an A-stage thermosetting resin is preferably utilized and is maintained at a temperature of about 20° to 80° C. immediately prior to its application to the graphite ribbon. In a particularly preferred embodiment of the invention the solventless system comprising an A-stage thermosetting resin is maintained at a temperature of about room temperature (e.g., about 25° C.) in order to optimize its pot life or period of usefulness prior to its application to the ribbon.

The solventless system comprising an A-stage thermosetting resin is flowable and the thermosetting resin is essentially uncured. Such resin when exposed to heat hardens or sets to a rigid solid consistency designated as a C-stage thermosetting resin, and may not subsequently be rendered plastic or flowable upon the reapplication of heat. The curing or hardening of the thermosetting resin is brought about by heat-promoted chemical changes which result in the formation of a compact, often cross-linked system. It is accordingly essential that graphite ribbon coated with such thermosetting resins be molded or shaped to form composites of the desired configuration prior to the point in time when the curing reaction has progressed to the C-stage. A B-stage thermosetting resin is defined as a partially cured thermosetting resin which has neither the consistency of a flowable liquid, nor the consistency of a rigid solid. A B-stage thermosetting resin is accordingly soft and tacky in its consistency and may be readily molded. Upon the passage of time even at room temperature a B-stage thermosetting resin will assume a C-stage consistency. This conversion from a B-stage consistency to a completely gelled C-stage consistency is accelerated or advanced by heat. The solventless system applied in the coating zone may comprise the A-stage thermosetting resin, one or more curing agents for said thermosetting resin, and one or more accelerators.

When the thermosetting resin is applied from a solvent system, the resin is dissolved in a solvent capable of dissolving the same to form a flowable liquid. Suitable solvents which are commonly utilized in such solvent systems include acetone, methyl ethyl ketone, dimethyl ketone, perchloroethylene, methylene chloride, ethylene dichloride, dimethyl formamide, etc. The thermosetting resin dissolved in the solvent may be either uncured or partially cured (i.e., advanced). The solvent component of the solvent system may be removed from the resin impregnated graphite ribbon either before or during its ultimate fabrication into a fiber reinforced composite. For instance, the solvent may be conveniently removed from the resin impregnated graphite ribbon by subjecting the same to moderate heating, such as by passing the resin impregnated graphite ribbon through an additional heating zone while preserving its ribbon configuration. If solvent remains in the graphite ribbon at the time it is molded, it is preferable that the mold used during the formation of a composite structure be of the "open" type whereby the solvent may escape from the same without producing voids in the resulting article. Substantially all of the curing of the thermosetting resin may occur during or after the ultimate formation of a composite structure. If desired, various modifiers or diluents of the reactive type also may be present within either the solventless or the solvent thermosetting resin systems. Such components form a permanent portion of the hardened thermosetting resin, and do not evaporate from the same during the curing reaction.

The thermosetting resin applied to the graphite ribbon in the coating zone may generally be selected from those thermosetting resins utilized in the production of fiber reinforced composites by prior art techniques. It is, of course, necessary that a thermosetting resin be selected which is either inherently liquid at the coating temperature or which may be modified to possess flowable properties at the coating temperature by the addition of a reactive modifier or diluent, or by dissolution in a solvent for the same. Illustrative examples of suitable thermosetting resins for use in the present process for the production of resin impregnated graphite ribbons include epoxy resins, phenolic resins, polyester resins, polyimide resins, etc.

An epoxy resin is the preferred thermosetting resin for use in the process of the present invention. The epoxy resins utilized in the present invention are most commonly prepared by the condensation of bisphenol A (4,4' isopropylidene diphenol) and epichlorohydrin. Also, other polyols, such as aliphatic glycols and novolac resins, acids or other active hydrogen containing compounds may be reacted with epichlorohydrin for the production of epoxy resins suitable for use in the instant process provided resins are selected which possess or can be modified to possess the requisite flow properties. Numerous reactive diluents or modifiers which are capable of increasing the flow properties of uncured epoxy resins are well known and include butyl glycidyl ether, higher molecular weight aliphatic and cycloaliphatic monoglycidyl ethers, styrene oxide, aliphatic and cycloaliphatic diglycidyl ethers, and mixtures of the above.

In a preferred embodiment of the invention epoxy resins are selected which possess terminal epoxide groups and are condensation products of bisphenol A and epichlorohydrin of the following formula:

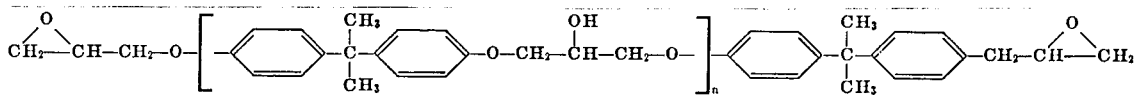

where $n$ varies between zero and a small number less than about 10. When $n$ is zero, the resin is a very fluid light-colored material which is essentially the diglycidyl ether of bisphenol A. As the molecular weight increases so generally does the viscosity of the resins. Accordingly, the particularly preferred liquid epoxy resins generally possess an n value averaging less than about 1.0. Illustrative examples by standard trade designations of particularly useful commercially available epoxy resins include: Epi-Rez 508, Epi-Rez 510 and Epi-Rez 5661 (Celanese Coatings), ERLA 2256 (Union Carbide), ERLA 4617 (Union Carbide), Epon (Shell), etc.

A variety of epoxy resin curing agents may be employed in conjunction with the epoxy resin. The curing or hardening of the epoxy resin typically involves further reaction of the epoxy or hydroxyl groups to cause molecular chain growth and cross-linking. The term "curing agent" as used herein is accordingly defined to include the various hardeners of the co-reactant type. Illustrative classes of known epoxy curing agents which may be utilized in the process include aliphatic and aromatic amines, polyamides, tertiary amines, amine adducts, acid anhydrides, acids, aldehyde condensation products, and Lewis acid type catalysts, such as boron trifluoride. The preferred epoxy curing agents for use in the process are acid anhydrides (e.g., hexahydrophthalic acid anhydride and methylbicyclo[2.2.1heptene-2,3-dicarboxylic anhydride isomers marketed under the designation Nadic Methyl Anhydride by the Allied Chemical Company) and aromatic amines (e.g., meta-phenylene diamine and dimethylaniline).

Immediately prior to the coating or impregnation of the graphite ribbon in accordance with the present process, the fibrous bundles optionally may be surface modified in order to promote optimum adhesion between the filaments and the thermosetting resin. For instance, the graphite ribbon may be passed through a gaseous atmosphere according to procedures known in the art, whereby devolatilization is promoted and the surface characteristics of the ribbon modified. Degassing or devolatilization may be performed by techniques such as heating the material while passing through a zone containing nitrogen at a temperature of about 1,200° C.

In a preferred embodiment of the process when the graphite ribbon is coated with a solventless system comprising an A-stage thermosetting resin, the coated ribbon may be continuously fed to a heating zone while retaining the essentially parallel relationship of the multifilament bundles within the coated ribbon. In such additional heating zone the graphite ribbon is heated at an elevated temperature and the A-stage thermosetting resin coating is converted to a soft and tacky B-stage thermosetting resin. Such conversion is accomplished while the coated graphite ribbon is continuously passed through a heating zone. The temperature of the heating zone in which the thermosetting resin is converted to a B-stage consistency will vary with the particular thermosetting resin utilized. In a preferred embodiment of the invention the graphite ribbon bearing a coating of an A-stage epoxy resin is passed through a heating zone maintained at about 80° to 250° C. for a residence time of about 3 seconds to about 5 minutes, and preferably about 3.5 to 180 seconds. The residence time utilized is generally inversely proportional to the temperature of the heating zone. In a particularly preferred embodiment of the invention the fibrous material bearing a coating of an A-stage epoxy resin is passed through a heating zone maintained at about 100° to 175° C. for a total residence time of about 40 to 180 seconds. Preferred heating zones for use in the process include enclosed furnace, and tube furnaces in which the coated graphite ribbon is suspended along the axial center of the furnace. The coated ribbon may also be heated while in sliding contact with a smooth surface placed over a heating element. Such technique is not preferred, however, because of the tendency for resin to build up upon the surface covering the heating element and to damage the ribbon passing thereover. It is essential that any heating of the graphite ribbon bearing the B-stage thermosetting resin be terminated while the thermosetting resin present upon the graphite ribbon is a B-stage thermosetting resin, and therefore before a rigid solid C-stage consistency is achieved. Air may be conveniently used as the atmosphere in the heating zone in which an A-stage thermosetting resin is converted to a tacky B-stage thermosetting resin.

Immediately prior to the introduction of the coated graphite ribbon into a heating zone in which a B-stage consistency is achieved, it is recommended that any excess resin present thereon be removed. For instance, excess resin may be conveniently removed by passage of the coated fibrous material between a pair of poly tetrafluoroethylene rollers which are positioned in a relatively closely spaced relationship.

The resulting resin impregnated graphite ribbon may be directly used in the shaping, winding or molding of the fiber reinforced composites, or placed in storage for future use. The present process enables the expeditious production of preimpregnated graphite ribbons which possess an extended shelf life. For instance, the epoxy impregnated graphite ribbons commonly may be stored as long as several days at room temperature while still retaining a B-stage consistency. If stored under refrigeration (e.g., at about 0° C.) such ribbons commonly exhibit a considerably longer shelf life (e.g., up to about 90 days or more). The exact shelf life will vary with the thermosetting resin selected.

The resin impregnated graphite ribbons produced in the present process find particular utility in the production of high performance structures which are highly useful in the aerospace industry. For instance, impellers, turbine blades, and similar lightweight structural components may be formed by conventional filament winding, molding, or shaping techniques.

The following examples are given as specific illustrations of the invention. It should be understood, however, that the invention is not limited to the specific details set forth in the examples. Reference is made in the examples to the drawings.

EXAMPLE I

An acrylonitrile homopolymer is dry spun to produce a 40 fil continuous filament yarn, and is hot drawn at a draw ratio of about 7.5:1 to obtain a highly oriented fibrous material having a single filament tenacity of about 7 grams per denier. Forty ends of this yarn are then plied to produce 1,600 fil bundles each having a total denier per bundle of about 2,300, and a twist of about 0.5 tpi. The bundles are stabilized (i.e., preoxidized) in air at 278° C. for 140 minutes on a continuous basis in accordance with the teachings of commonly assigned U.S. Pat. application, Ser. No. 865,332, filed Oct. 10, 1969, of Kenneth S. Burns and William M. Cooper which is herein incorporated by reference. The stabilized bundles are black in appearance, exhibit a bound oxygen content of 11 percent by weight as determined by the Unterzaucher analysis, retain their original fibrous configuration essentially intact, and are non-burning when subjected to an ordinary match flame.

Figure 1:
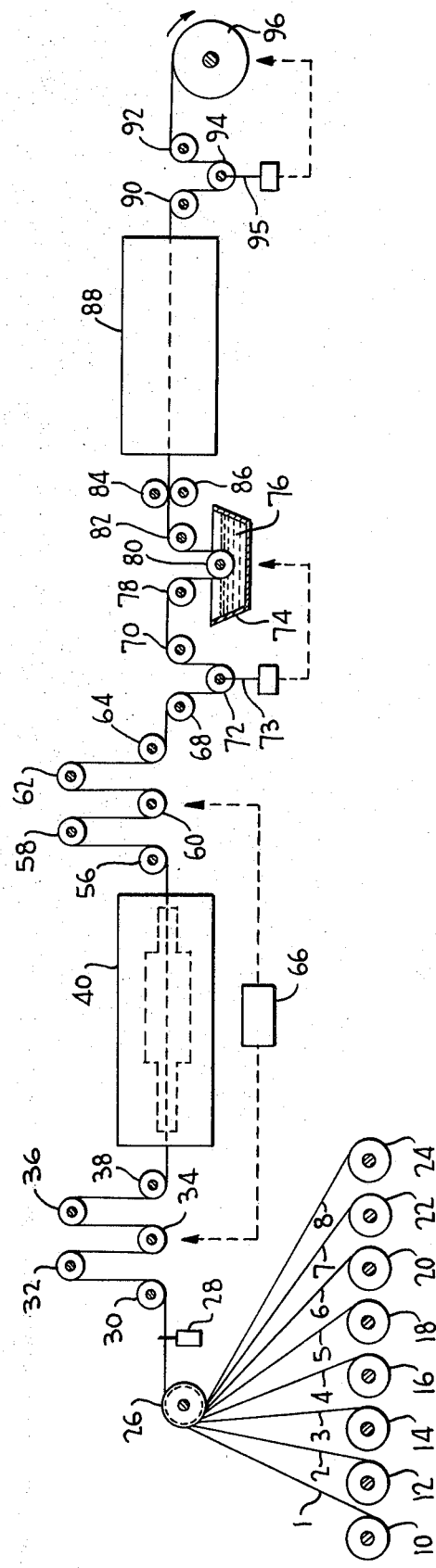
FIG. 1 is a schematic view of an apparatus arrangement suitable for carrying out the process of the present invention.

As shown in FIG. 1, continuous lengths of the bundles 1, 2, 3, 4, 5, 6, 7, and 8 are provided on rotating bobbins 10, 12, 14, 16, 18, 20, 22, and 24. As the bundles are unwound from the respective bobbins at a rate of 0.25 meter/minute, they are passed to a rotatable slotted or grooved roll 26 with each bundle being individually positioned within one of a plurality of adjacent grooves on the surface of the same and thereby aligned in parallel. The parallel multifilament bundles 1, 2, 3, 4, 5, 6, 7, and 8 then each pass through adjacent teeth of comb 28 whereby their parallel relationship is preserved, and then are looped about a plurality of cylindrical driven rolls 30, 32, 34, 36, and 38 which are precisionally aligned in parallel. The multifilament bundles of stabilized acrylic fibrous material while at room temperature (i.e., about 25° C.) enter and are continuously passed through the carbonization/graphitization zone 40 which is provided with a nitrogen atmosphere while the bundles remain in an essentially parallel relationship and in the form of a ribbon. Air is excluded from carbonization/graphitization zone 40 by means of a nitrogen overpressure. Alternatively, air may be excluded from carbonization/graphitization zone 40 by mercury seals, or a series of back diffusion chambers. The parallel relationship of the multifilament bundles 1, 2, 3, 4, 5, 6, 7, and 8 as they pass over cylindrical roll 38 and into the heating zone in which carbonization and graphitization are carried out is illustrated in FIG. 3.

Figure 2:
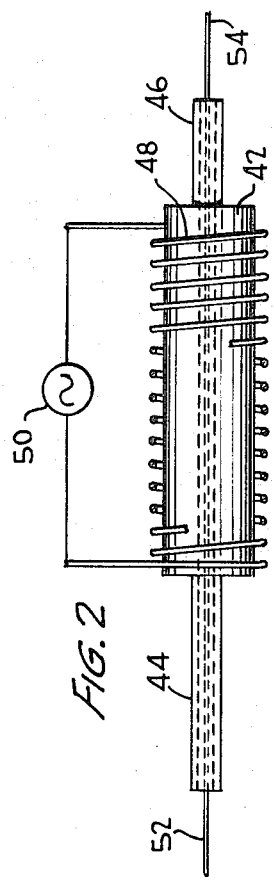
FIG. 2 is a side view showing the interior of the induction furnace of FIG. 1 wherein carbonization and graphitization of a plurality of multifilament bundles of a stabilized acrylic fibrous material may be carried out while the bundles are in an essentially parallel relationship and in the form of a ribbon prior to passing the ribbon to the coating zone.

The carbonization/graphitization zone 40 includes an Inductotherm 10 KC induction furnace which is equipped with a 20 KW power source. As illustrated in FIG. 2, a main susceptor 42 formed of graphite having a length of 18 inches, an outer diameter of 2 ¼ inches and an inner diameter of one-half inch is provided. At the entrance end of main susceptor 42 is positioned an auxiliary graphite susceptor 44 having a length of 12 inches, an outer diameter of 1 inch, and an inner diameter of one-half inch. At the exit end of main susceptor 42 is positioned an additional auxiliary graphite susceptor 46 having a length of 6 inches, an outer diameter of 1 inch, and an inner diameter of one-half inch. A hollow water cooled copper coil 48 having a coil inner diameter of 5 inches and a length of 18 inches substantially encompasses main susceptor 42. The copper coil 48 is connected to 20 KW power source 50. The ribbon 52 consisting of 8 parallel fibrous bundles of stabilized acrylic fibrous material enters the carbonization/graphitization zone 40 where it is elevated from room temperature (i.e., about 25° C.) to a temperature of 1,400° C. in about 60 seconds during which time it is converted to a carbonized ribbon consisting of essentially amorphous carbon. As the carbonized ribbon continues its path through the carbonization/graphitization zone 40, it is subjected to an increasing and then a decreasing temperature profile with its temperature being raised from about 1,400° C. to a maximum temperature about 2,900° C. within about 30 seconds. The ribbon is exposed to the maximum temperature of about 2,900° C. for about 40 seconds during which time the essentially amorphous carbon of the carbonized ribbon is substantially converted to graphitic carbon. The resulting graphite ribbon is next exposed to progressively decreasing temperatures through the remaining portion of the zone 40, and upon exiting at 54 again assumes room temperature (i.e., about 25° C.). Upon physical testing each bundle within the graphite ribbon is found to have essentially uniform physical properties (i.e., tensile strength and Young's modulus).

The graphite ribbon next passes over a plurality of driven cylindrical rolls 56, 58, 60, 62, and 64. The relative speeds of the driven rolls 30, 32, 34, 36, and 38 situated before the carbonization/graphitization zone 40 in relationship to the speeds of driven rolls 56, 58, 60, 62, and 64 situated thereafter are controlled by drive mechanism 166. The relative speeds of these rolls are adjusted so that a tension of about 300 grams is exerted upon each multifilament bundle of the stabilized acrylic fibrous material as it passes through the carbonization/graphitization zone 40.

The resulting graphite ribbon next is passed over a pair of cylindrical idler rolls 68 and 70 as well as about intermediate cylindrical roll 72. After leaving cylindrical roll 70 the graphite ribbon is immersed in vessel 74 which contains a solventless system 76 comprising an A-stage epoxy resin by the aid of driven rolls 78, 80, and 82. Tension is applied to the ribbon by means of a weight attached to intermediate cylindrical roll 72. Dancer arm 73 is connected to the shaft of intermediate roll 72 and movement of the arm is sensed by a photo-electric cell (not shown) which actuates driven rolls 78, 80, and 82 so that the graphite ribbon is under a constant tension of about 70 grams per fibrous bundle while impregnated in vessel 74.

The solventless epoxy resin system contains 100 parts by weight of a condensation product of bisphenol A and epichlorohydrin, 87 parts by weight of hexahydrophthalic acid anhydride curing agent, and 1 part by weight of benzyldimethylamine which serves as an accelerator. The epoxy resin is commercially available from the Celanese Coatings Company under the designation Epi-Rez 508. The solventless epoxy resin system 76 is at a temperature of 25° C. as the graphite ribbon passes through the same.

The coated graphite ribbon is next passed between a pair of polytetrafluoroethylene rollers 84 and 86 having a spacing of 0.011 inch where excess resin coating is removed. The essentially parallel relationship of the bundles within the coated graphite ribbon is maintained as the ribbon is continuously fed to heating zone 88. As the coated graphite ribbon is continuously passed through heating zone 88, the A-stage epoxy resin present thereon is converted to a tacky B-stage consistency and the essentially parallel relationship of the fibrous graphite bundles within the ribbon is preserved. The heating zone 88 is a forced convection oven wherein the coated graphite ribbon is heated in an air atmosphere at 123° C. for a residence time of 2½ minutes. As the coated graphite ribbon is withdrawn from the heating zone 88 bearing the B-stage epoxy resin coated thereon, it is passed over a pair of idler rolls 90 and 92 as well as about intermediate roll 94. Tension is applied to the ribbon by means of a weight attached to intermediate roll 94. Dancer arm 95 is connected to the shaft of intermediate roll 94 and movement of the arm is sensed by a photo-electric cell (not shown) which actuates the rotation of driven storage roll 96 so that the graphite ribbon is wound upon storage roll 96 at a constant tension of about 50 grams per fibrous bundle. The preimpregnated graphite ribbon exhibits a shelf life of about 5 days at room temperature wherein optimum flexibility is maintained, and of about 90 days while under refrigeration at 0° C., and may be wound to form fiber reinforced composites by conventional techniques.

EXAMPLE II

Example I is repeated with the exception that 0.3 part by weight of 1-methylimidazole accelerator is substituted for 1 part by weight of benzyldimethylamine accelerator, and the coated graphite ribbon is heated in heating zone 88 for 2½ minutes at 146° C.

EXAMPLE III

Example I is repeated with the exception that the solventless epoxy resin contains 100 parts by weight of the condensation product of orthophthalic acid and epichlorohydrin which is essentially the diglycidyl ester of orthophthalic acid, and 19 parts by weight of metaphenylene diamine curing agent. The epoxy resin is commercially available from the Celanese Coatings Company under the designation Epi-Rez 5661. The coated graphite ribbon is heated in heating zone 88 for 2½ minutes at 141° C.

EXAMPLE IV

Example I is repeated with the exception that a solvent thermosetting resin system is applied in vessel 76. The resin system contains 100 parts by weight of the condensation product isophthalic acid and epichlorohydrin which is essentially the diglycidyl ester of isophthalic acid, 39.5 parts by weight of diaminodiphenyl sulfone curing agent, and 15 parts by weight of acetone solvent. The resin impregnated ribbon is heated in heating zone 88 for 2½ minutes at 70° C. during which time a portion of the acetone solvent is evolved. The resin impregnated graphite ribbon is flexible and contains an essentially uncured epoxy component. The ribbon may be shaped or molded in an open mold to form a composite article.

EXAMPLE V

Example I is repeated with the exception that a solvent thermosetting resin system is applied in vessel 76. The resin system contains 100 parts by weight of a condensation product of bisphenol A and epichlorohydrin which is essentially the diglycidyl ether of bisphenol A, 32.6 parts by weight diaminodiphenyl sulfone curing agent, 1 part by weight boron trifluoride-monoethylamine complex curing agent, and 60 parts by weight methyl ethyl ketone solvent. The resin impregnated ribbon is heated in heating zone 88 for 10 minutes at 135° C. during which time essentially all of the solvent is evolved, and the resin converted to a B-stage consistency.

EXAMPLE VI

Example I is repeated with the exception that the multifilament fibrous bundles which serve as the starting material are a carbonaceous yarn derived from an acrylonitrile homopolymer containing about 99 percent carbon by weight and exhibiting an essentially amorphous X-ray diffraction pattern.

EXAMPLE VII

Example I is repeated with the exception that the multifilament fibrous bundles which serve as the starting material are a carbonaceous yarn derived from rayon containing about 99 percent carbon by weight and exhibiting an essentially amorphous X-ray diffraction pattern.

Although the invention has been described with preferred embodiments it is to be understood that variations and modifications may be resorted to as will be apparent to those skilled in the art. Such variations and modifications are to be considered within the purview and scope of the claims appended hereto.

I claim:

1. A process for the continuous production of a resin impregnated graphite ribbon for use in the manufacture of fiber reinforced composites comprising:
   a. continuously passing a plurality of substantially uniform multifilament bundles of a fibrous material capable of undergoing graphitization while in an adjoining essentially parallel relationship and in the form of a ribbon having a thickness corresponding to that of a single multifilament bundle with each bundle being under a substantially uniform tension through a graphitization zone at a temperature of about 2,000° to 3,100° C. and containing an inert atmosphere for a residence time sufficient to substantially convert said bundles to graphitic carbon while retaining their original fibrous configuration essentially intact,
   b. continuously feeding the resulting bundles of fibrous graphitic carbon from said graphitization zone to a coating zone,
   c. continuously passing said bundles of graphitic carbon through said coating zone while retaining said adjoining essentially parallel relationship of said bundles and said ribbon configuration having a thickness corresponding to that of a single multifilament bundle with each bundle being under a substantially uniform tension wherein said ribbon is impregnated with a thermosetting resin, and
   d. withdrawing the resulting resin impregnated graphite ribbon from said coating zone.

2. A process according to claim 1 wherein said plurality of multifilament bundles of a fibrous material capable of undergoing graphitization contain at least about 90 percent carbon by weight and exhibit an essentially amorphous X-ray diffraction pattern.

3. A process according to claim 1 wherein said multifilament bundles of a fibrous material capable of undergoing graphitization are derived from a fibrous material selected from the group consisting of an acrylonitrile homopolymer and acrylonitrile copolymers which contain at least about 85 mol percent of acrylonitrile units and up to about 15 mol percent of one or more monovinyl units copolymerized therewith.

4. A process according to claim 1 wherein said multifilament bundles of fibrous material capable of undergoing graphitization are passed through said graphitization zone at a temperature of about 2,400° to 3,100° C.

5. A process according to claim 1 wherein said multifilament bundles are continuous multifilament yarns having essentially no twist.

6. A process according to claim 1 wherein said multifilament bundles are continuous multifilament yarns having a twist of about 0.1 to 5 tpi.

7. A process according to claim 1 wherein said thermosetting resin is an epoxy resin.

8. A process for the continuous production of a resin impregnated graphite ribbon for use in the manufacture of fiber reinforced composites comprising:
  a. continuously passing a plurality of substantially uniform multifilament bundles of a fibrous material capable of undergoing graphitization while in an adjoining essentially parallel relationship and in the form of a ribbon having a thickness corresponding to that of a single multifilament bundle with each bundle being under a substantially uniform tension through a graphitization zone at a temperature of about 2,000° to 3,100° C. and containing an inert atmosphere for a residence time sufficient to substantially convert said bundles to graphitic carbon while retaining their original fibrous configuration essentially intact,
  b. continuously feeding the resulting bundles of graphitic carbon from said graphitization zone to a coating zone,
  c. continuously passing said bundles of graphitic carbon through said coating zone while retaining said adjoining essentially parallel relationship of said bundles and said ribbon configuration having a thickness corresponding to that of a single multifilament bundle with each bundle being under a substantially uniform tension wherein said bundles are coated with a solventless system comprising an A-stage thermosetting resin,
  d. continuously feeding said coated ribbon from said coating zone to a heating zone while retaining said adjoining essentially parallel relationship of said bundles within said ribbon,
  e. continuously passing said coated ribbon through said heating zone wherein said A-stage thermosetting resin present on said ribbon is converted to B-stage thermosetting resin while retaining said adjoining essentially parallel relationship of said bundles within said ribbon, and
  f. continuously withdrawing said coated graphite ribbon from said heating zone while said thermosetting resin present on said ribbon is a B-stage thermosetting resin.

9. A process according to claim 8 wherein said plurality of multifilament bundles of a fibrous material capable of undergoing graphitization contain at least about 90 percent carbon by weight and exhibit an essentially amorphous X-ray diffraction pattern.

10. A process according to claim 9 wherein said multifilament bundles of a fibrous material capable of undergoing graphitization are derived from a fibrous material selected from the group consisting of an acrylonitrile homopolymer and acrylonitrile copolymers which contain at least about 85 mol percent of acrylonitrile units and up to about 15 mol percent of one or more monovinyl units copolymerized therewith.

11. A process according to claim 8 wherein said multifilament bundles of fibrous material capable of undergoing graphitization are passed through said graphitization zone at a temperature of about 2,400° to 3,100° C.

12. A process according to claim 9 wherein said multifilament bundles are continuous multifilament yarns having essentially no twist.

13. A process according to claim 9 wherein said multifilament bundles are continuous multifilament yarns having a twist of about 0.3 to 1.0 tpi.

14. A process according to claim 9 wherein said solventless system comprising an A-stage thermosetting resin comprises an A-stage epoxy resin and a curing agent for said epoxy resin.

15. A process according to claim 14 wherein said epoxy resin is a condensation product of bisphenol A and epichlorohydrin.

16. A process for the continuous production of a resin impregnated graphite ribbon for use in the manufacture of fiber reinforced composites comprising:
  a. continuously passing while in an adjoining essentially parallel relationship and in the form of a ribbon having a thickness corresponding to that of a single multifilament bundle a plurality of substantially uniform multifilament bundles of a stabilized acrylic fibrous material with each bundle being under a substantially uniform tension having a temperature within the range of about 20° to 500° C. which is non-burning when subjected to an ordinary match flame and derived from an acrylic fibrous material selected from the group consisting of an acrylonitrile homopolymer and acrylonitrile copolymers which contain at least about 85 mol percent of one or more monovinyl units copolymerized therewith through a carbonization heating zone provided with an inert atmosphere in which said bundles of stabilized acrylic fibrous material are raised within a period of about 3 seconds to about 10 minutes to a temperature within the range of about 900° C. to about 1,600° C. wherein a carbonized ribbon is formed,
  b. continuously passing said carbonized ribbon through a graphitization heating zone provided with an inert atmosphere while retaining said adjoining parallel relationship of said bundles within said ribbon with each bundle being under a substantially uniform tension in which said carbonized ribbon is heated at a temperature within the range of about 2,000° to 3,100° C. for a residence time sufficient to substantially convert said bundles to graphitic carbon,
  c. continuously feeding the resulting bundles of graphitic carbon from said graphitization heating zone to a coating zone,
  d. continuously passing said bundles of graphitic carbon through said coating zone while retaining said adjoining essentially parallel relationship of said bundles and said ribbon configuration having a thickness corresponding to that of a single multifilament bundle with each bundle being under a substantially uniform tension wherein said ribbon is impregnated with a thermosetting resin, and
  e. withdrawing the resulting resin impregnated graphite ribbon from said coating zone.

17. A process according to claim 16 wherein said multifilament bundles are continuous multifilament yarns having essentially no twist.

18. A process according to claim 16 wherein said multifilament bundles are continuous multifilament yarns having a twist of about 0.1 to 5 tpi.

19. A process according to claim 16 wherein said multifilament bundles of stabilized acrylic fibrous material are derived from an acrylonitrile homopolymer.

20. A process according to claim 16 wherein said carbonized ribbon is continuously passed through a graphitization heating zone at about 2,400° to 3,100° C. for a residence time sufficient to convert said bundles forming the same to graphitic carbon.

21. A process for the continuous production of a resin impregnated graphite ribbon for use in the manufacture of fiber reinforced composites comprising:

a. continuously passing while in an adjoining essentially parallel relationship and in the form of a ribbon having a thickness corresponding to that of a single multifilament bundle a plurality of substantially uniform multifilament bundles of a stabilized acrylic fibrous material with each bundle being under a substantially uniform tension having a temperature within the range of about 20° to 500° C. which is non-burning when subjected to an ordinary match flame and derived from an acrylic fibrous material selected from the group consisting of an acrylonitrile homopolymer and acrylonitrile copolymers which contain at least about 85 mol percent of acrylonitrile units and up to about 15 mol percent of one or more monovinyl units copolymerized therewith through a carbonization heating zone provided with an inert atmosphere in which said bundles of stabilized acrylic fibrous material are raised within a period of about 3 seconds to about 10 minutes to a temperature within the range of about 900° C. to about 1,600° C. wherein a carbonized ribbon is formed, b. continuously passing said carbonized ribbon through a graphitization heating zone provided with an inert atmosphere while retaining said adjoining parallel relationship of said bundles within said ribbon with each bundle being under a substantially uniform tension in which said carbonized ribbon is heated at a temperature within the range of about 2,400° to 3,100° C. for a residence time sufficient to substantially convert said bundles to graphitic carbon, c. continuously feeding the resulting bundles of graphitic carbon from said graphitization heating zone to a coating zone, d. continuously passing said bundles of graphitic carbon through said coating zone while retaining said adjoining essentially parallel relationship of said bundles and said ribbon configuration having a thickness corresponding to that of a single multifilament bundle with each bundle being under a substantially uniform tension wherein said ribbon is coated with a solventless system comprising an A-stage thermosetting resin, e. continuously feeding said coated ribbon from said coating zone to a heating zone while retaining said adjoining essentially parallel relationship of said bundles within said ribbon, f. continuously passing said coating ribbon through said heating zone wherein said A-stage thermosetting resin present on said ribbon is converted to B-stage thermosetting resin while retaining said adjoining essentially parallel relationship of said bundles within said ribbon, and g. continuously withdrawing said coated graphite ribbon from said heating zone while said thermosetting resin present on said ribbon is a B-stage thermosetting resin.

22. A process according to claim 21 wherein said stabilized acrylic fibrous material is derived from an acrylonitrile homopolymer.

23. A process according to claim 21 wherein said solventless system comprising an A-stage thermosetting resin comprises an A-stage epoxy resin and a curing agent for said epoxy resin.

24. A process according to claim 22 wherein said A-stage epoxy resin is a condensation product of bisphenol A and epichlorohydrin.

* * * * *